US010084765B2

(12) United States Patent
Doherty et al.

(10) Patent No.: US 10,084,765 B2
(45) Date of Patent: Sep. 25, 2018

(54) SECURE, UNTETHERED PROVISIONING AND TROUBLESHOOTING OF WIRELESS NETWORK DEVICES (71) Applicant: Adtran, Inc., Huntsville, AL (US)

(72) Inventors: Kenneth M. Doherty, Waltham, MA (US); Thomas F. Guevin, Nashua, NH (US)

(73) Assignee: Adtran, Inc., Huntsville, AL (US)

( * ) Notice: Subject to any disclaimer, the term of this patent is extended or adjusted under 35 U.S.C. 154(b) by 23 days.

(21) Appl. No.: 14/547,435

(22) Filed: Nov. 19, 2014

(65) Prior Publication Data

US 2016/0142388 A1 May 19, 2016

(51) Int. Cl.
*H04L 29/06* (2006.01)
*H04W 12/06* (2009.01)
*H04W 76/14* (2018.01)
*H04W 76/10* (2018.01)
*H04W 12/04* (2009.01)

(52) U.S. Cl.
CPC ............. *H04L 63/08* (2013.01); *H04W 12/04* (2013.01); *H04W 12/06* (2013.01); *H04W 76/10* (2018.02); *H04W 76/14* (2018.02)

(58) Field of Classification Search
CPC .............................. G06F 21/34; H04L 63/0853
USPC .......................................................... 726/9
See application file for complete search history.

(56) References Cited

U.S. PATENT DOCUMENTS

| 2005/0086328 A1* | 4/2005 | Landram ................ H04L 67/34 709/220 |
| 2012/0254960 A1* | 10/2012 | Lortz .................... H04L 63/104 726/7 |
| 2015/0082410 A1* | 3/2015 | Fitzgerald ............... H04L 63/08 726/9 |

\* cited by examiner

*Primary Examiner* — Anthony D Brown
(74) *Attorney, Agent, or Firm* — Smith Tempel Blaha LLC; Michael J. Tempel (57) ABSTRACT A wireless network device only installs configuration information that is wirelessly received from a provisioning device if the wireless network device successfully authenticates a security token it receives from the provisioning device. The provisioning device can obtain the security token by scanning a label associated with the wireless network device or by other methods.

10 Claims, 12 Drawing Sheets

SECURE, UNTETHERED PROVISIONING AND TROUBLESHOOTING OF WIRELESS NETWORK DEVICES

BACKGROUND

A wireless network is a digital communications network that allows a wireless network device to communicate with or access a computer network via a radio communication link. Perhaps the most common type of wireless network is that which is commonly referred to as WiFi® or 802.11, the latter term in reference to the IEEE 802.11 set of standards that govern such networks. Such an 802.11 network comprises one or more access points (APs) that are each connected by a wired connection with a router or similar networking device. The router or other such networking device allows a client device, such as a portable computer, smartphone, etc., to communicate with or access a computer network.

Each AP, router, or other wireless network device includes a processing system that operates under control of firmware stored in a non-volatile memory. Some of the firmware may be pre-installed (i.e., stored in the memory) by the manufacturer of the wireless network device. However, other portions of the firmware, such as firmware that controls settings or configuration options, are commonly installed by a system administrator or other person charged with setting up and maintaining a wireless network. Installing configuration firmware in a network device is commonly referred to as "provisioning" the network device.

To install a new wireless network device in a wireless network, the person connects a cable, such as an Ethernet cable, between a communication port on the wireless network device and a communication port on another device, which can be referred to for convenience as a provisioning device. A laptop computer is commonly employed as a provisioning device. The person then uses a software tool on the provisioning device to transfer the configuration firmware from the provisioning device to the wireless network device via the cable. After the configuration firmware transfer is completed, the person disconnects the cable and performs one or more additional steps to complete the installation of the wireless network device in the wireless network.

From time to time, a system administrator or other such person may wish to update the configuration firmware in a wireless network device that has been installed previously in a wireless network. The provisioning process by which configuration firmware is updated is the same as the above-described provisioning process by which configuration firmware is initially installed in a new wireless network device, involving connecting a cable, transferring configuration firmware via the cable, etc.

It is important that a wireless network device be provisioned in a secure manner that precludes unauthorized persons from installing configuration firmware or other firmware. In the provisioning process described above, the physical, i.e., wired, connection provided by the cable provides such security because the person performing the provisioning process has personal control over the entire cable connection between the wireless network device and the provisioning device. Although some types of wireless network devices, such as APs, include radio systems, such native radio systems are not used for provisioning the wireless network device because they are not secure. Rather, the native radio system of an AP is only used for communication within the wireless network, i.e., after the AP has been configured and otherwise completely installed in the wireless network.

SUMMARY

Embodiments of the invention relate to a system, method, and computer program product for provisioning a wireless network device. Configuration information that is wirelessly provided by a provisioning device can be installed in the wireless network device only if the wireless network device successfully authenticates a security token it wirelessly receives from the provisioning device.

In an illustrative or exemplary embodiment, one aspect of a method for provisioning a wireless network device includes: establishing a wireless communication link between the wireless network device and a provisioning device; the wireless network device receiving a security token from the provisioning device via the wireless communication link; the wireless network device authenticating the security token received via the wireless communication link; and the wireless network device storing configuration information received from the provisioning device via the wireless communication link in response to successful authentication of the security token by the wireless network device. In another aspect, such a method for provisioning a wireless network device includes: the provisioning device receiving a security token; establishing a wireless communication link between the provisioning device and the wireless network device; transmitting the security token from the provisioning device to the wireless network device via the wireless communication link; and transmitting configuration information from the provisioning device to the wireless network device via the wireless communication link.

In the exemplary embodiment, the wireless network device includes a radio interface configured to provide wireless communication and a processing system comprising a firmware memory and a processor. The processing system is configured to include the following logic elements: communication logic configured to establish a wireless communication link between the wireless network device and a provisioning device; security token logic configured to receive a security token from the provisioning device via the wireless communication link; authentication logic configured to authenticate the security token received via the wireless communication link; and configuration logic configured to store in the firmware memory configuration information received from the provisioning device via the wireless communication link in response to successful authentication of the security token.

In the exemplary embodiment, the provisioning device includes a radio interface configured to provide wireless communication and a processing system comprising a firmware memory and a processor. The processing system configured to include provisioning logic configured to receive a security token, to transmit the security token to a wireless network device via a wireless communication link, and to transmit configuration information to the wireless network device via the wireless communication link.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
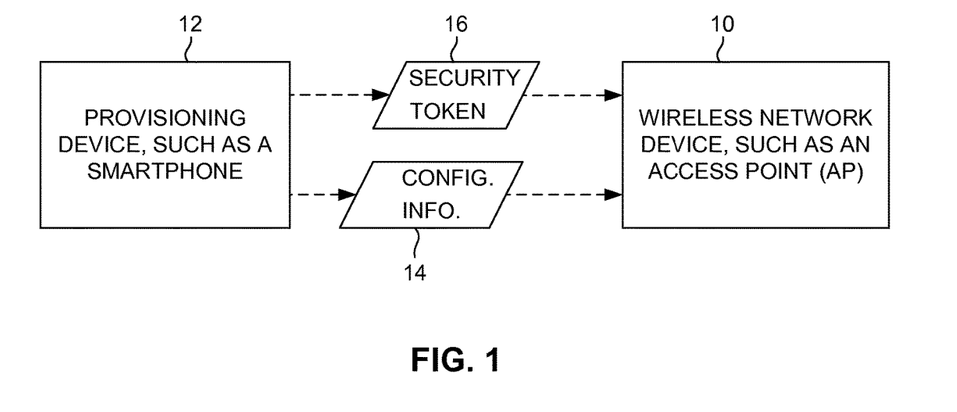
FIG. 1 is a schematic illustration of an access point (AP) or other wireless network device receiving a security token and configuration information from a provisioning device via a wireless communication link, in accordance with exemplary embodiments of the invention.

As illustrated in FIG. 1, in an illustrative or exemplary embodiment of the invention, a wireless network device such as an access point (AP) 10 and a provisioning device such as a smartphone 12 can communicate with each other via a wireless communication link to provision or configure AP 10 for operation. The wireless communication link can be established by any suitable wireless data communication technology. Examples of suitable wireless data communication technologies include WiFi® (IEEE 802.11), Near-Field Communication (NFC), Bluetooth®, and cellular technologies such as GSM, CDMA, UMTS, LTE, etc. Although in the exemplary embodiment the wireless network device that is provisioned or configured is a wireless network access point (AP 10), in other embodiments any other suitable type of wireless network device can be provisioned or configured in a similar manner. As used herein, the term "wireless network device" includes any device that is characterized by a wireless data networking function.

As described below in further detail, AP 10 or other wireless network device can be provisioned or configured by providing it with configuration information 14. As used herein, the term "configuration information" refers to information in digital form that affects how AP 10 processes network data when AP 10 is performing the functions that characterize it as a network access point. Significantly, as described below in further detail, AP 10 does not become configured with the configuration information unless AP 10 successfully authenticates a security token 16 that AP 10 receives from smartphone 12 via the wireless communication link. Although in the exemplary embodiment the provisioning device that transmits configuration information 14 to AP 10 is smartphone 12, in other embodiments a provisioning device can be, for example, a laptop computer, a tablet computer, or any other suitable device that can perform the functions described herein.

Figure 2:
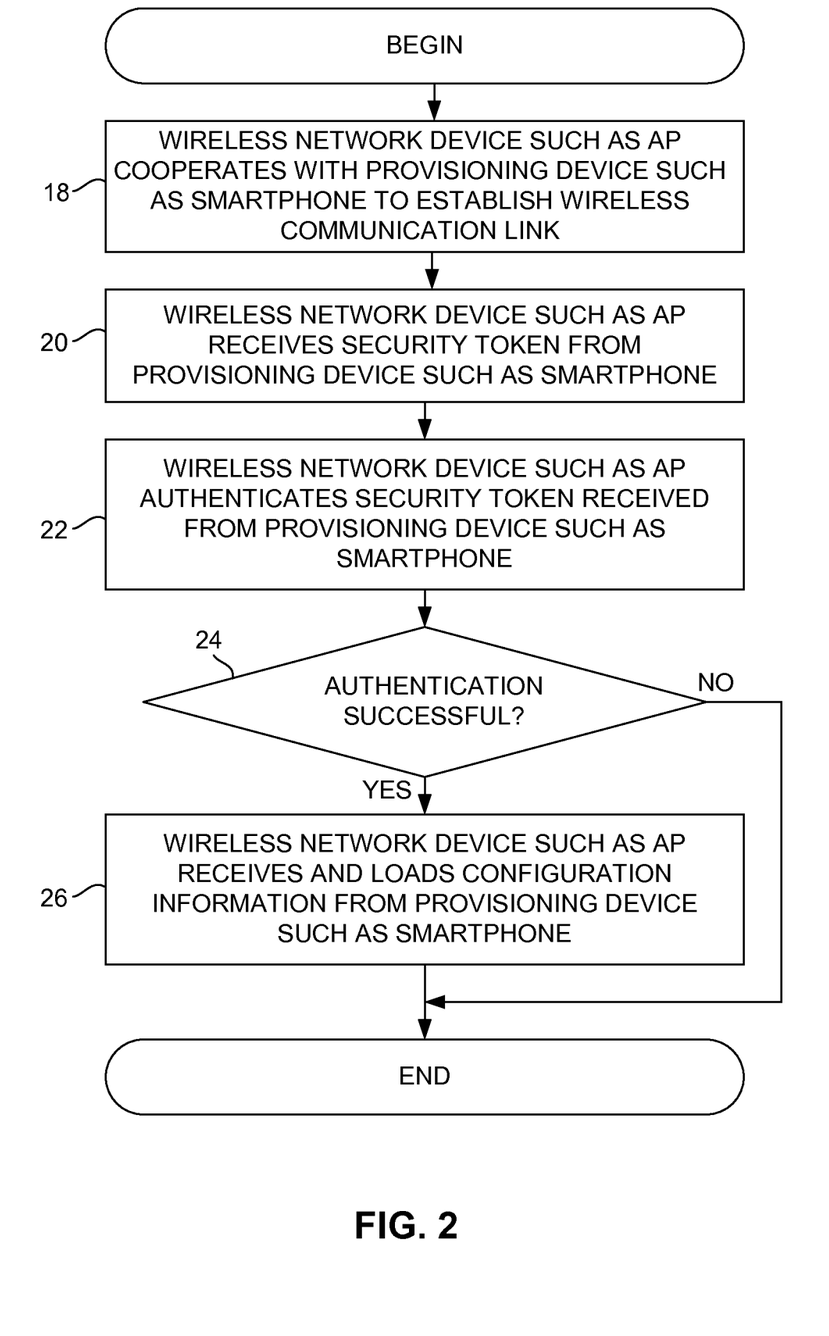
FIG. 2 is a flow diagram illustrating a method of operation in an AP or other wireless network device, in accordance with the exemplary embodiment of the invention.

As illustrated by the flow diagram of FIG. 2, AP 10 or other wireless network device can implement an exemplary provisioning method. As indicated by block 18, AP 10 can participate in establishing a wireless communication link with smartphone 12. In the exemplary embodiment, the wireless communication link is of the type commonly referred to as Near-Field Communication (NFC). As indicated by block 20, AP 10 can receive the security token 16 from smartphone 12. Security token 16 can be, for example, a string of characters similar to a password, or any other suitable structure that is known to be usable for authentication purposes. As indicated by block 22, AP 10 then attempts to authenticate security token 16. For example, AP 10 can compare security token 16 with information that previously has been stored in AP 10. Alternatively, AP 10 can perform a decryption algorithm on security token 16 using a key that previously has been stored in AP 10 and compare the decrypted security token 16 with information that previously has been stored in AP 10. In such an instance, security token 16 can be likened to a private key of a public key encryption system, with the information that previously has been stored in AP 10 functioning as a public key. If the authentication (block 24) is successful, then AP 10 receives and loads configuration information from smartphone 12 via the wireless communication link, as indicated by block 26. If the authentication (block 24) fails, then AP 10 does not receive and load configuration information from smartphone 12 via the wireless communication link.

Figure 3:
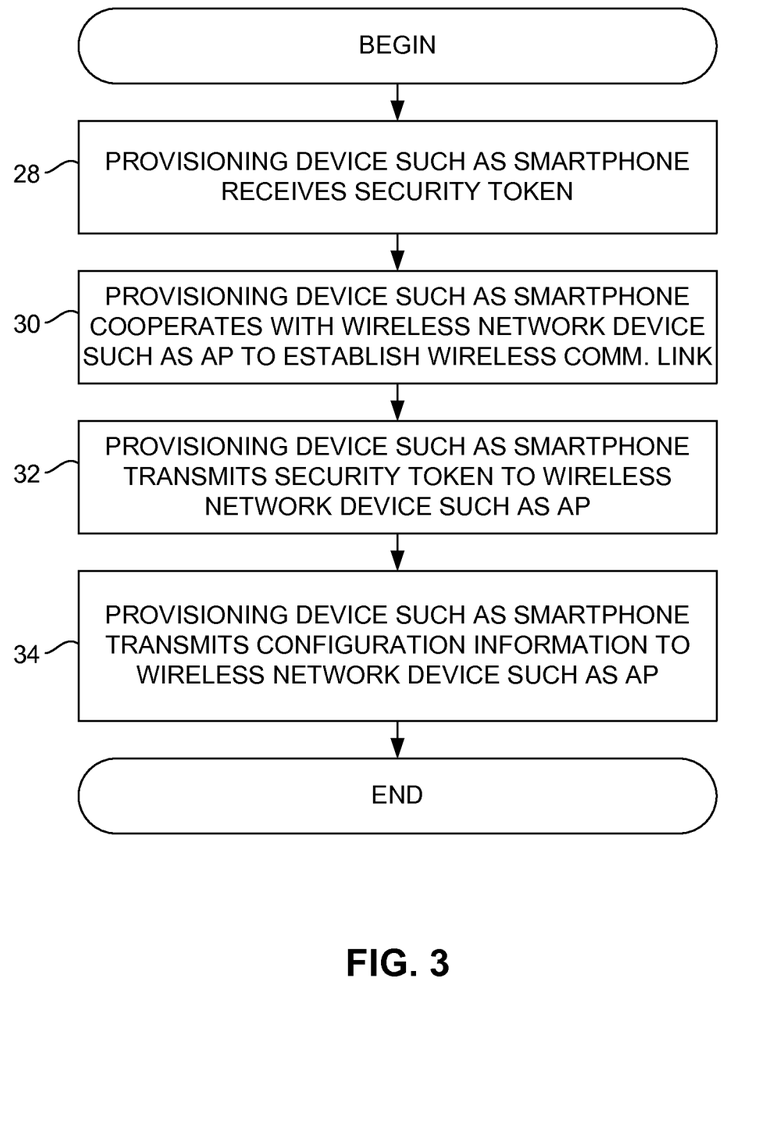
FIG. 3 is a flow diagram illustrating a method of operation in a smartphone or other provisioning device, in accordance with the exemplary embodiment of the invention.

As illustrated by the flow diagram of FIG. 3, smartphone 12 or other provisioning device can implement an exemplary provisioning method. As indicated by block 28, smartphone 12 can receive security token 16 in any suitable manner, including those described below with regard to FIGS. 4-9. As indicated by block 30, smartphone 12 can participate in establishing the above-described wireless communication link with AP 10. As indicated by block 32, smartphone 12 can then transmit security token 16 to AP 10 via the wireless communication link. As described above, this wireless communication link can be, for example, an NFC link. As indicated by block 34, smartphone 12 can transmit the configuration information to AP 10 via the wireless communication link. As described above with regard to FIG. 2, AP 10 only receives and loads the configuration information if AP 10 successfully authenticates security token 16.

Figure 4:
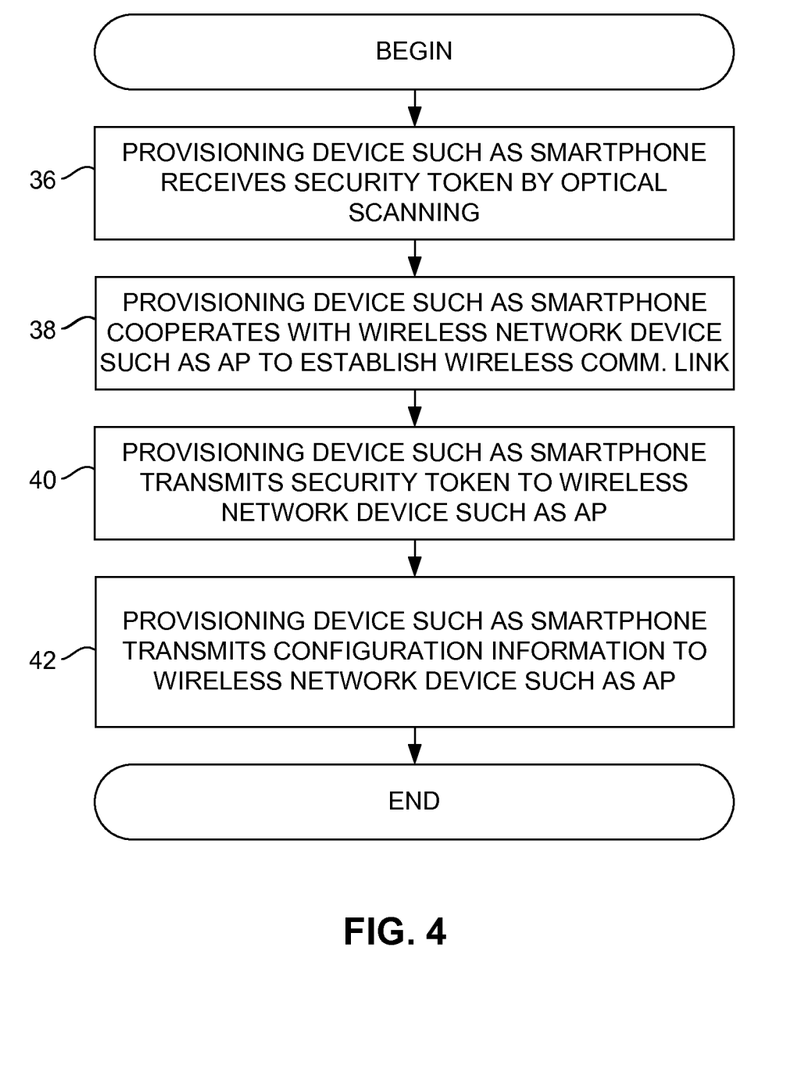
FIG. 4 is a flow diagram illustrating a first alternative method of operation in a smartphone or other provisioning device.

As illustrated by the flow diagram of FIG. 4, smartphone 12 or other provisioning device can implement an exemplary provisioning method. Blocks 38, 40 and 42 are the same as above-described blocks 30, 32 and 34, respectively. Block 36 indicates that smartphone 12 can receive security token 16 by optically scanning a label (not shown) or similar element that bears a code, such as a barcode, QR code or other matrix code, etc. The label can be affixed to AP 10 (by, for example, the manufacturer of AP 10). Alternatively, the scanned element can be a paper (not shown) that is included in along with AP 10, such as in packaging in which a user of AP receives AP 10 from a retailer or other source. For example, the paper can be an invoice or packing slip.

Figure 5:
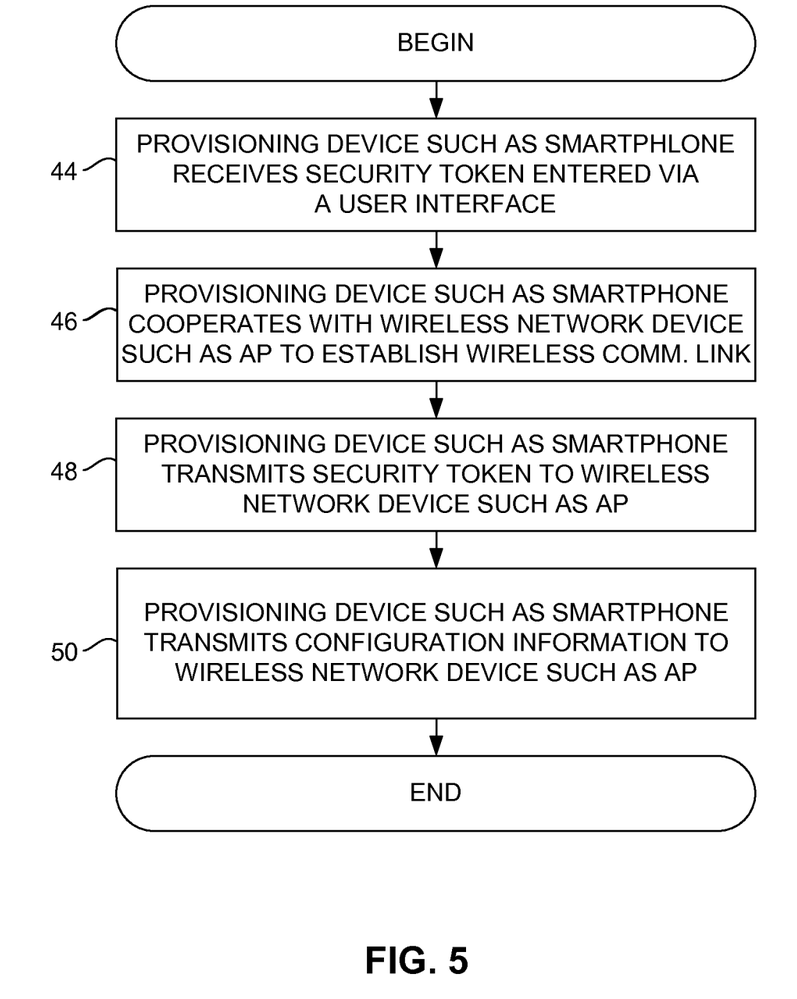
FIG. 5 is a flow diagram illustrating a second alternative method of operation in a smartphone or other provisioning device.

As illustrated by the flow diagram of FIG. 5, smartphone 12 or other provisioning device can implement an exemplary provisioning method. Blocks 46, 48 and 50 are the same as above-described blocks 30, 32 and 34, respectively. Block 44 indicates that smartphone 12 can receive security token 16 via a user interface. For example, the user interface can include a touch-screen display 120 (FIG. 11) on which a user can type a string of characters that represent security token 16.

Figure 6:
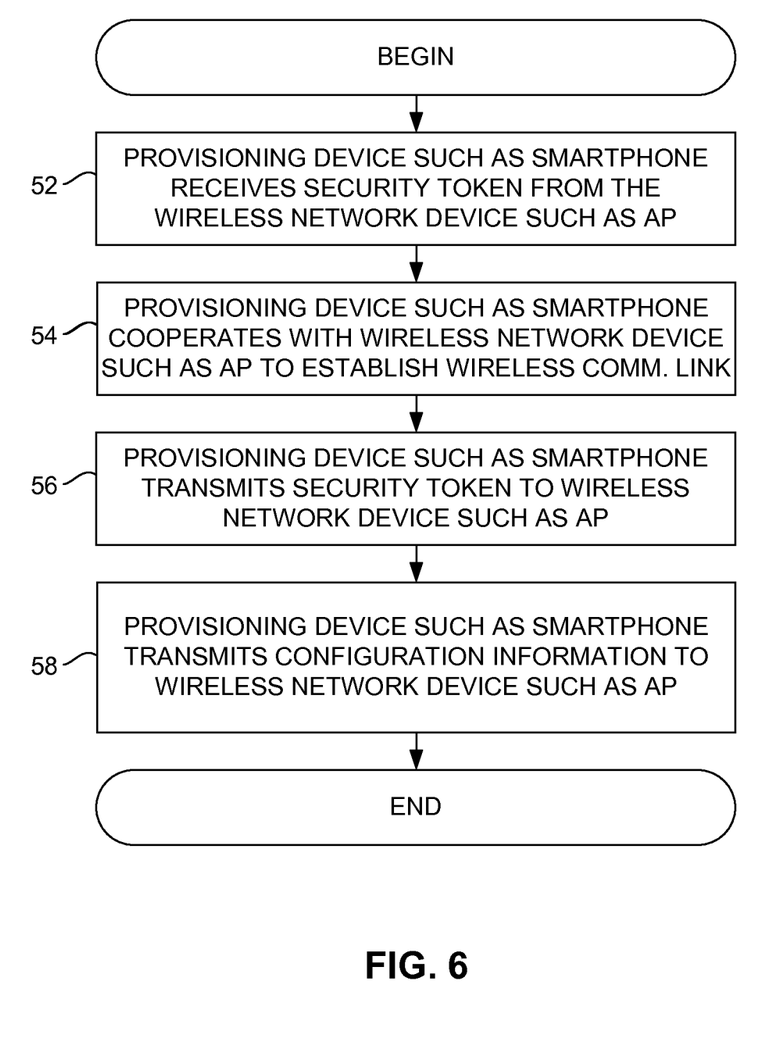
FIG. 6 is a flow diagram illustrating a third alternative method of operation in a smartphone or other provisioning device.

As illustrated by the flow diagram of FIG. 6, smartphone 12 or other provisioning device can implement an exemplary provisioning method. Blocks 54, 56 and 58 are the same as above-described blocks 30, 32 and 34, respectively. Block 52 indicates that smartphone 12 can receive security token 16 from AP 10 via the above-described wireless communication link. For example, AP 10 can emit a temporary SSID network name to which smartphone 12 connects to receive security token 16 via a temporary 802.11 communication link, i.e., a temporary 802.11 network. In an embodiment in which smartphone 12 or other provisioning device receives security token 16 from AP 10 or other wireless network device, it is contemplated that security token 16 is transferred (block 52) in this manner at a time preceding the time at which security token 16 is transferred (block 56) from smartphone 12 or other provisioning device back to AP 10 or other wireless network device for authentication. Also, after smartphone 12 or other provisioning device receives security token 16 from AP 10 or other wireless network device, AP 10 can disable the temporary 802.11 network. Thus, the temporary 802.11 network is only used for purposes of providing smartphone 12 or other provisioning device with security token 16. Once smartphone 12 or other provisioning device has security token 16, the remainder of the provisioning process occurs via the NFC or other wireless communication link that is established in accordance with block 54. Thus, security token 16 and configuration information 14 are transferred (blocks 56 and 58, respectively) from smartphone 12 or other provisioning device to AP 10 or other wireless network device via the NFC or other wireless communication link.

Figure 7:
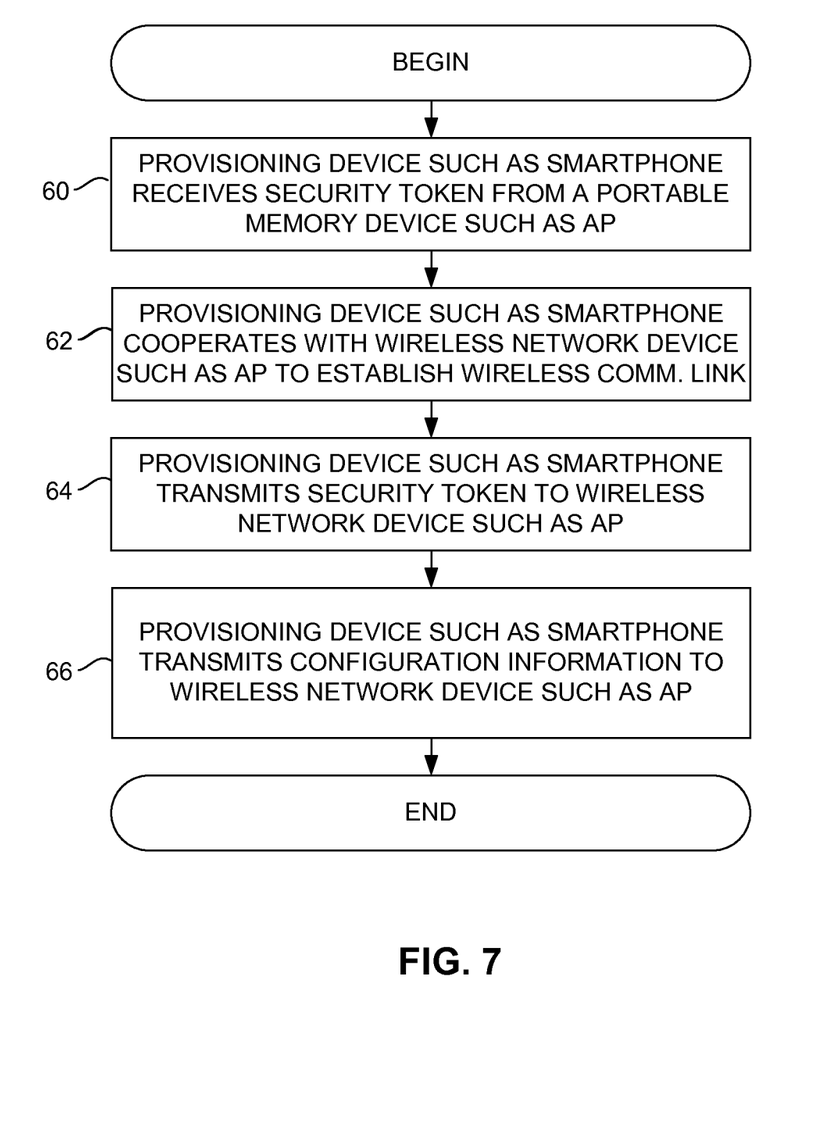
FIG. 7 is a flow diagram illustrating a fourth alternative method of operation in a smartphone or other provisioning device.

As illustrated by the flow diagram of FIG. 7, smartphone 12 or other provisioning device can implement an exemplary provisioning method. Blocks 62, 64 and 66 are the same as above-described blocks 30, 32 and 34, respectively. Block 60 indicates that smartphone 12 can receive security token 16 by reading a portable memory device, such as a MicroSD card, which is received in a receptacle 130 (FIG. 11) of smartphone 12. In addition to MicroSD and other SD-type cards, other suitable types of portable memory devices through which security token 16 can be received include USB flash memory devices and any other memory devices through which data can be loaded into a smartphone or similar device.

Figure 8:
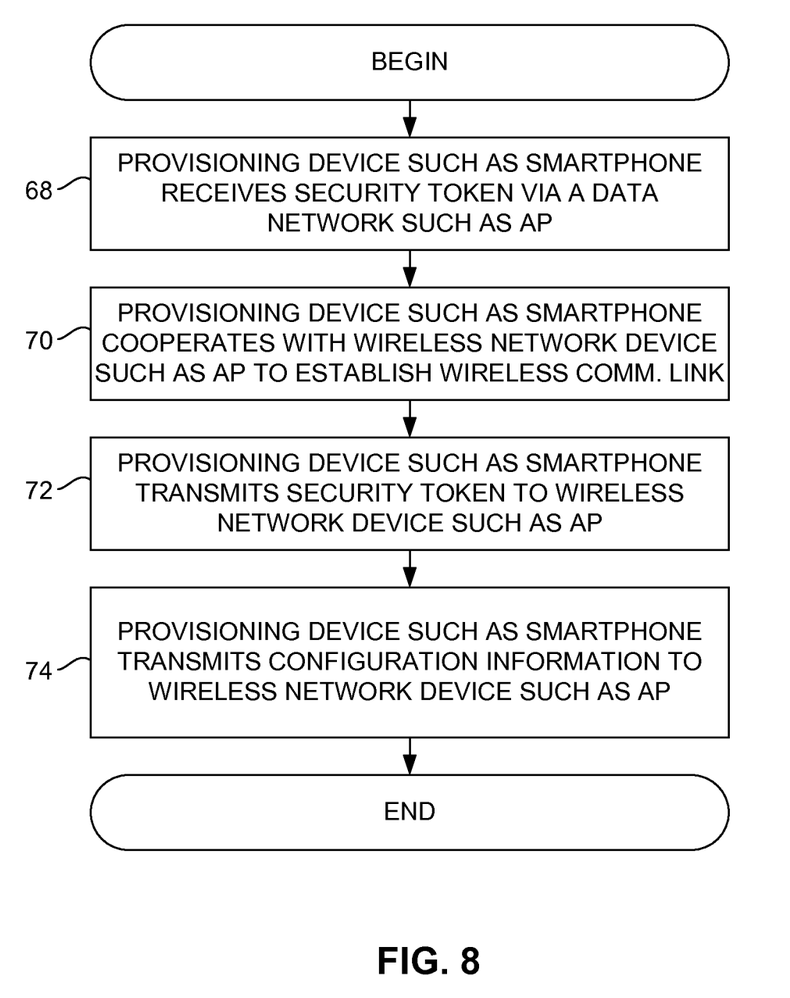
FIG. 8 is a flow diagram illustrating a fifth alternative method of operation in a smartphone or other provisioning device.

As illustrated by the flow diagram of FIG. 8, smartphone 12 or other provisioning device can implement an exemplary provisioning method. Blocks 70, 72 and 74 are the same as above-described blocks 30, 32 and 34, respectively. Block 68 indicates that smartphone 12 can receive security token 16 via a data network (not shown) from a remote computer or other device. The communication link between smartphone 12 and such a remote device can include one or more wired or wireless links through one or more data networks.

Figure 9:
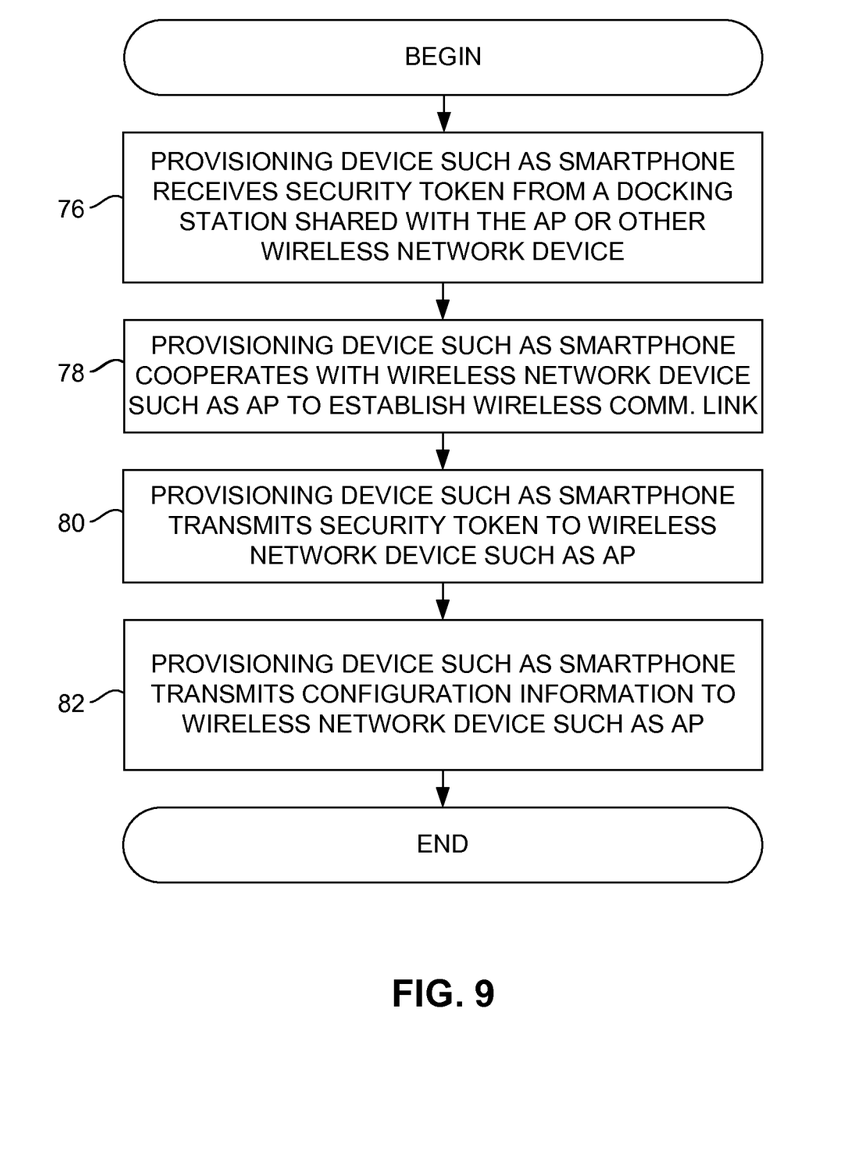
FIG. 9 is a flow diagram illustrating a sixth alternative method of operation in a smartphone or other provisioning device.
Figure 12:
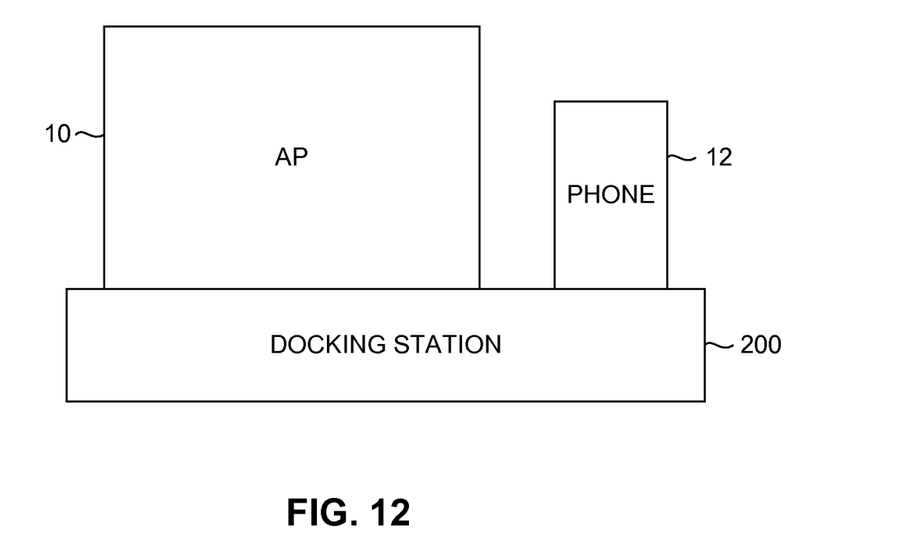
FIG. 12 is a schematic illustration of an AP and a smartphone connected to a docking station.

As illustrated by the flow diagram of FIG. 9, smartphone 12 can implement an exemplary provisioning method. Blocks 78, 80 and 82 are the same as above-described blocks 30, 32 and 34, respectively. Block 76 indicates that smartphone 12 or other provisioning device can receive security token 16 via a docking station 200 (FIG. 12) or similar hardware device to which both smartphone 12 and AP 10 are physically attached. Docking station 200 thus can provide security token 16 to smartphone 12 or other provisioning device.

Figure 10:
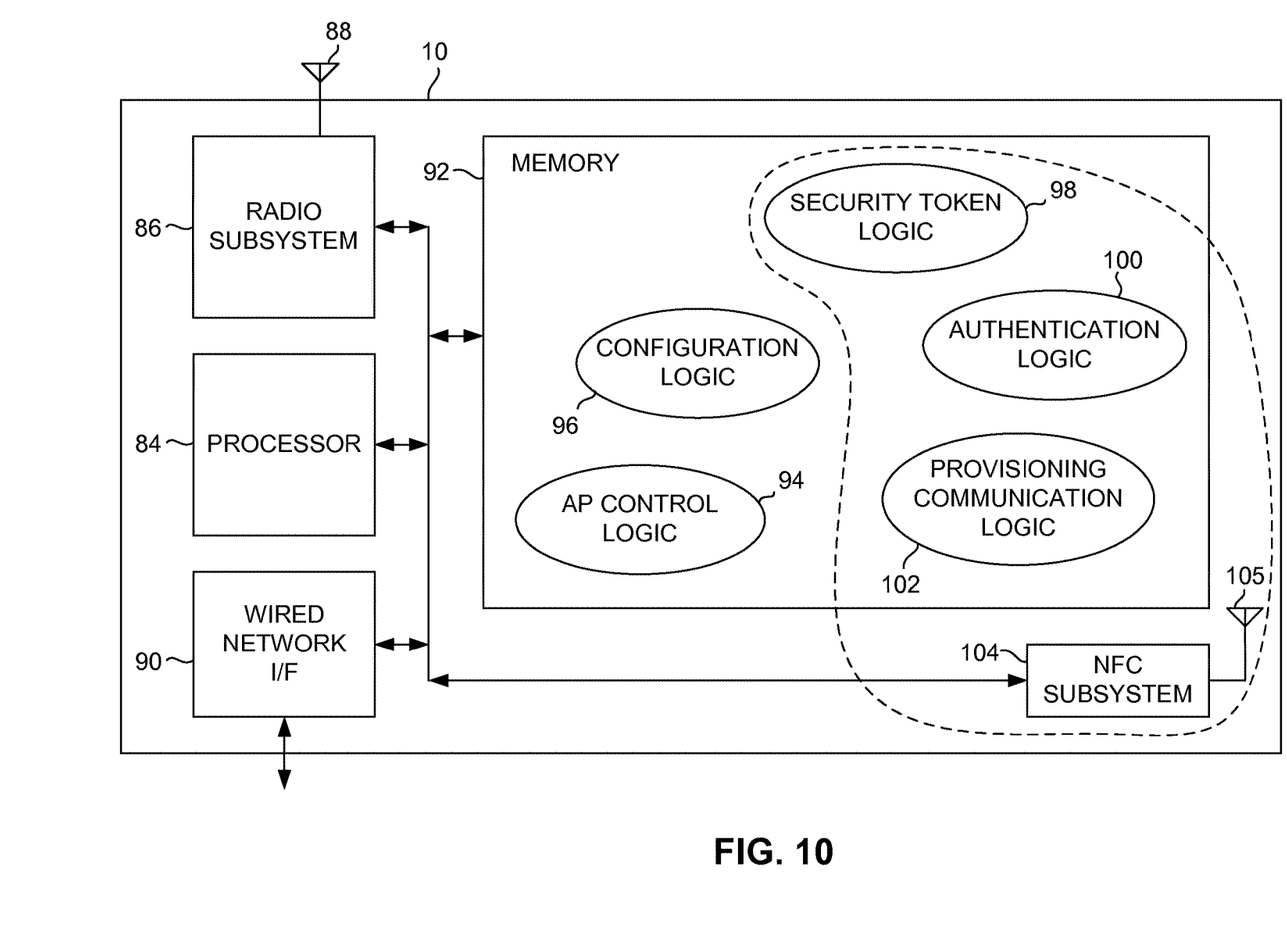
FIG. 10 is a block diagram illustrating an AP configured to implement methods of operation in accordance with exemplary embodiments of the invention.

As illustrated in FIG. 10, AP 10 can include a processor 84, a radio (transceiver) subsystem 86 and corresponding antenna 88, a wired network interface 90, and a memory 92. In addition to these elements, AP 10 can include any other suitable elements commonly included in conventional wireless access points. Not all of the conventional elements of AP 10 are shown or described herein, as they are well understood by persons skilled in the art. As well understood in the art, AP 10 can wirelessly communicate with client devices (not shown) via antenna 88 and native radio subsystem 86 in accordance with IEEE 802.11 or similar WLAN standards. The AP 10 also can communicate with a switch (not shown) or other element of a wired network (e.g., Ethernet LAN) via wired network interface 90.

The AP 10 includes the following logic elements: AP control logic 94, configuration logic 96, security token logic 98, authentication logic 100, and proximity communication logic 102. Although the foregoing logic elements are shown in FIG. 10 in a conceptual manner as stored in or residing in memory 92, persons skilled in the art understand that such logic elements arise through the operation of processor 84 under control of software, firmware or other logic and may not be present simultaneously or in their entireties in memory 92. Such software or firmware can be stored or otherwise embodied in any suitable non-transitory medium, including any suitable type of memory, and operated upon in memory 92 or other storage in accordance with well-known computing principles.

It should be understood that the combination of memory 92 and the above-referenced logic elements or software, firmware, instructions, etc., underlying the logic elements, as stored in memory 92 in non-transitory, computer-readable form, defines a "computer program product" as that term is understood in the patent lexicon. In view of the descriptions herein, persons skilled in the art will readily be capable of providing suitable software or firmware or otherwise configuring AP 10 to operate in the manner described. Also, although the effect of each of the above-referenced logic elements is generally described herein, it should be understood that the effect may result from contributions of two or more logic elements, or from contributions of the logic elements and conventional features that are not shown in FIG. 10 for purposes of clarity.

The AP control logic 94 contributes to the configuring of AP 10 to operate in a conventional manner that is characteristic of a wireless access point. For example, AP control logic 94 can control native radio subsystem 86 in a manner that establishes and controls wireless communication links with client devices. In other words, AP control logic 94 can be of a conventional type that is included in conventional wireless access points. As persons skilled in the art are readily capable of providing such AP control logic 94, it is not described in further detail herein.

Configuration logic 96 contributes to the configuring of AP 10 to receive and store in memory 92 the above-described configuration information 14 (FIG. 1). As well understood in the art, such configuration information can include, for example, various settings that a system administrator can select so that AP 10 processes network data in a manner desired by the system administrator. Configuration logic 96 can be similar to conventional configuration logic that contributes to a conventional AP receiving configuration information via a cable from a computer or similar provisioning device and storing the received configuration information in memory. However, configuration logic 96 differs from conventional configuration logic in that configuration logic 96 does not perform these functions unless authentication logic 100 provides an indication that security token 16 has been successfully authenticated.

Provisioning communication logic 102 contributes to the configuring of AP 10 to participate in establishing the above-described wireless communication link with a provisioning device such as smartphone 12. An NFC subsystem 104 and associated antenna 105 are included in the exemplary embodiment as a provisioning wireless communication subsystem to establish such a wireless communication link. Although in the exemplary embodiment NFC subsystem 104 is included for purposes of establishing this wireless communication link with a provisioning device such as smartphone 12, in other embodiments radio subsystem 86 can be used for this purposes instead of a separate provisioning wireless communication subsystem. Also, although in the exemplary embodiment such a provisioning wireless communication subsystem comprises NFC subsystem 104, in other embodiments such a provisioning wireless communication subsystem can be of any other suitable type, such as 802.11, Bluetooth®, cellular technologies, etc.

Although NFC subsystem 104 is depicted in FIG. 10 for purposes of clarity as contained or enclosed within AP 10, NFC subsystem 104 alternatively can be located externally to AP 10 and connected to AP 10 by a cable or connector. Also, NFC subsystem 104 can include its own memory separate from memory 92, and logic elements that are associated with NFC subsystem 104, such as proximity communication logic 102, security token logic 98 and authentication logic 100 can be associated with the memory of NFC subsystem 104 instead of with memory 92 as depicted in FIG. 10. Thus, although in the exemplary embodiment NFC subsystem 104 and the associated logic elements that define a provisioning wireless communication subsystem 106 are contained within AP 10 (e.g., within a common housing), in other embodiments such a secondary wireless communication subsystem can comprise a separate hardware device or module (not shown) that plugs into or otherwise connects to AP 10 via a suitable interface. It is contemplated that a conventional AP can be retrofitted with such a module so that the retrofitted AP effectively has a structure equivalent to the structure shown in FIG. 10.

Security token logic 98 contributes to the configuring of AP 10 to receive security token 16 via the wireless (e.g., NFC) communication link. Once AP 10 has received security token 16, AP 10 can attempt to authenticate it. Authentication logic 100 contributes to the configuring of AP 10 to authenticate the received security token 16 in the manner described above with regard to FIG. 2.

Figure 11:
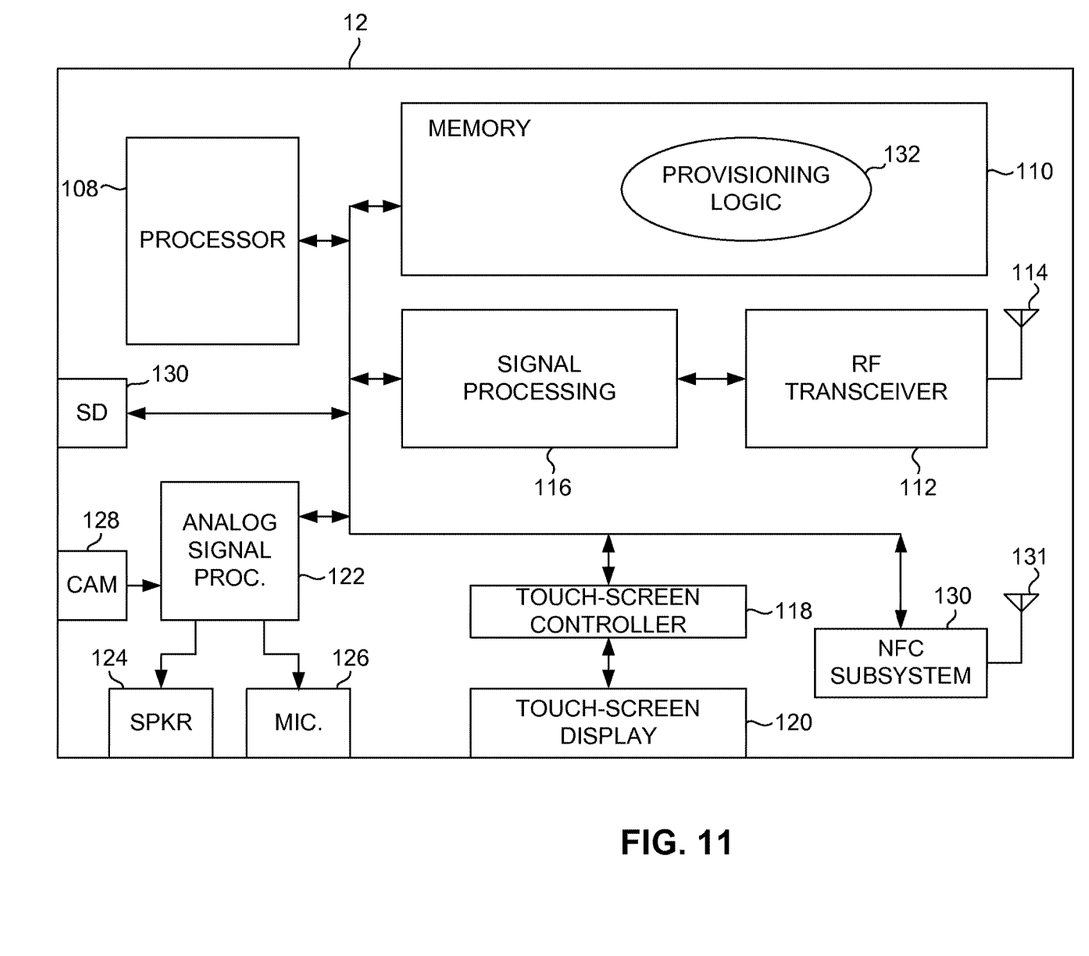
FIG. 11 is a block diagram illustrating a smartphone configured to implement methods of operation in accordance with exemplary embodiments of the invention.

As illustrated in FIG. 11, smartphone 12 can include, for example, a processor 108, a memory 110, a radio frequency (RF) transceiver 112 and corresponding antenna 114, signal processing circuitry 116, a touch-screen controller 118 and corresponding touch-screen display 120, analog signal processing circuitry 122, a speaker 124, a microphone 126, a camera 128, and a memory card (e.g., SD) interface 130. Smartphone 12 also includes an NFC subsystem 130 and associated antenna 131 that are similar to above-described NFC subsystem 104 and associated antenna 105 of AP 10. It should be understood that in the exemplary embodiment the above-referenced wireless communication link can be established in a conventional manner through the co-operation of NFC subsystem 104 and NFC subsystem 130. However, as noted above, in other embodiments such a wireless communication link can be established using any other suitable technology, such as WiFi® (IEEE 802.11), Bluetooth®, and cellular technologies such as GSM, CDMA, UMTS, LTE, etc. Although for purposes of clarity only the foregoing elements of smartphone 12 are illustrated, smartphone 12 can include additional elements that are commonly included in conventional smartphones, such as, for example, a Bluetooth® subsystem, a WiFi® (IEEE 802.11) subsystem, a GPS receiver, etc. As well understood in the art, smartphone 12 can wirelessly communicate voice and data with remote devices in a conventional manner via a cellular telephone network (not shown), which can also provide smartphone 12 with access to the Internet. Smartphone 12 can receive token 16 via camera 128 in the embodiment described above with regard to FIG. 4. Smartphone 12 can receive token 16 via touch-screen display 120 in the embodiment described above with regard to FIG. 5. Smartphone 12 can receive token 16 via NFC subsystem 130 in the embodiment described above with regard to FIG. 6. Smartphone 12 can receive token 16 via memory card interface 130 in the embodiment described above with regard to FIG. 7. Smartphone 12 can receive token 16 via the Internet in the embodiment described above with regard to FIG. 8.

Smartphone 12 includes provisioning logic 132. Provisioning logic 132 contributes to the configuring of smartphone 12 to receive and store security token 16, transmit security token 16 to AP 10 via the above-described wireless communication link, and transmit configuration information to AP 10 via the wireless communication link. Although not shown for purposes of clarity, smartphone 12 also includes conventional logic that contributes to the configuring of smartphone 12 to operate in the manner of a conventional smartphone. Although provisioning logic 132 is shown in FIG. 11 in a conceptual manner as stored in or residing in memory 110, persons skilled in the art understand that such a logic element arises through the operation of processor 108 under control of software, firmware or other logic. Such software or firmware can be stored or otherwise embodied in any suitable non-transitory medium, including any suitable type of memory, and operated upon in memory 110 or other storage in accordance with well-known computing principles. It should be understood that the combination of memory 110 and such logic elements or software, firmware, instructions, etc., underlying the logic elements, as stored in memory 110 in non-transitory, computer-readable form, defines a "computer program product" as that term is understood in the patent lexicon. In view of the descriptions herein, persons skilled in the art will readily be capable of providing suitable software or firmware or otherwise configuring smartphone 12 to operate in the manner described.

One or more illustrative or exemplary embodiments of the invention have been described above. However, it is to be understood that the invention is defined by the appended claims and is not limited to the specific embodiments described.

What is claimed is:

1. A method for provisioning a wireless networking device with configuration information to configure the wireless networking device for processing data communications in a data communication network, comprising:

a hand-held provisioning device receiving a security token by optically scanning the security token;

establishing a wireless communication link between the wireless networking device and the hand-held provisioning device;

the wireless networking device receiving the security token from the hand-held provisioning device via the wireless communication link;

the wireless networking device authenticating the security token received via the wireless communication link; and the wireless networking device storing configuration information received from the hand-held provisioning device via the wireless communication link in response to being enabled to store the configuration information by successful authentication of the security token by the wireless networking device.

2. A method for provisioning a wireless networking device with configuration information to configure the wireless networking device for processing data communications in a data communication network, comprising:

a hand-held provisioning device receiving a security token by optically scanning the security token;

establishing a wireless communication link between the hand-held provisioning device and the wireless networking device;

transmitting the security token from the hand-held provisioning device to the wireless networking device via the wireless communication link; and transmitting configuration information from the hand-held provisioning device to the wireless networking device via the wireless communication link.

3. A computer program product for provisioning a wireless networking device with configuration information to configure the wireless networking device for processing data communications in a data communication network, the computer program product comprising a computer-readable medium having stored thereon in non-transitory computer-readable form instructions that when executed by a processing system of the wireless networking device causes the wireless networking device to implement a method comprising:

a hand-held provisioning device receiving a security token by optically scanning the security token;

establishing a wireless communication link between the wireless networking device and the hand-held provisioning device;

receiving the security token from the hand-held provisioning device via the wireless communication link;

authenticating the security token received via the wireless communication link; and storing configuration information received from the hand-held provisioning device via the wireless communication link in response to being enabled to store the configuration information by successful authentication of the security token by the wireless networking device.

4. A hand-held provisioning device, comprising:

a wireless communication subsystem configured to provide wireless communication among one or more network devices and one or more client devices in a data communication network; and a processing system comprising a firmware memory and a processor, the processing system configured to include:

provisioning logic configured to receive a security token by optically scanning the security token, to transmit the security token to a wireless networking device via a wireless communication link, and to transmit configuration information to the wireless networking device via the wireless communication link, the configuration information configuring the wireless networking device for processing data communications in a data communication network.

5. A computer program product for provisioning a wireless networking device with configuration information for processing data communications in a data communication network, the computer program product comprising a computer-readable medium having stored thereon in non-transitory computer-readable form instructions that when executed by a processing system of a hand-held provisioning device causes the hand-held provisioning device to implement a method comprising:

receiving a security token by optically scanning the security token;

establishing a wireless communication link between the hand-held provisioning device and the wireless networking device;

transmitting the security token from the hand-held provisioning device to the wireless networking device via the wireless communication link; and transmitting configuration information from the hand-held provisioning device to the wireless networking device via the wireless communication link.

6. The method of claim 1, wherein the hand-held provisioning device receiving a security token by optically scanning the security token comprises optically scanning one of: a label affixed to the wireless networking device; a portion of packaging associated with the wireless networking device; an invoice; and a packing slip.

7. The method of claim 2, wherein the hand-held provisioning device receiving a security token by optically scanning the security token comprises optically scanning one of: a label affixed to the wireless networking device; a portion of packaging associated with the wireless networking device; an invoice; and a packing slip.

8. The computer program product of claim 3, wherein the hand-held provisioning device receiving a security token by optically scanning the security token comprises optically scanning one of: a label affixed to the wireless networking device; a portion of packaging associated with the wireless networking device; an invoice; and a packing slip.

9. The hand-held provisioning device of claim 4, wherein the provisioning logic is configured to receive the security token by optically scanning one of: a label affixed to the wireless networking device; a portion of packaging associated with the wireless networking device; an invoice; and a packing slip.

10. The computer program product of claim 5, wherein receiving a security token by optically scanning the security token comprises optically scanning one of: a label affixed to the wireless networking device; a portion of packaging associated with the wireless networking device; an invoice; and a packing slip.

* * * * *